United States Patent
Kim et al.

(10) Patent No.: US 11,003,005 B2
(45) Date of Patent: May 11, 2021

(54) DISPLAY APPARATUS AND MANUFACTURING METHOD THEREOF

(71) Applicant: Samsung Display Co., Ltd., Yongin-si (KR)

(72) Inventors: Yeun Tae Kim, Suwon-si (KR); Hee-Keun Lee, Suwon-si (KR); Pilsook Kwon, Incheon (KR); Sangil Kim, Yongin-si (KR); Nakcho Choi, Seoul (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 15/844,405

(22) Filed: Dec. 15, 2017

(65) Prior Publication Data

US 2018/0107049 A1     Apr. 19, 2018

Related U.S. Application Data

(63) Continuation of application No. 13/089,046, filed on Apr. 18, 2011, now Pat. No. 9,846,323.

(30) Foreign Application Priority Data

Sep. 10, 2010   (KR) ........................ 10-2010-0089056

(51) Int. Cl.
  *G02F 1/1333*   (2006.01)
  *G02F 1/1681*   (2019.01)
(52) U.S. Cl.
  CPC ...... *G02F 1/133377* (2013.01); *G02F 1/1681* (2019.01)
(58) Field of Classification Search
  None
  See application file for complete search history.

(56) References Cited

U.S. PATENT DOCUMENTS 5,015,074 A * 5/1991 Clerc ................ G02F 1/133377
                                                    349/139
5,386,307 A  1/1995 Jang
(Continued)

FOREIGN PATENT DOCUMENTS

JP    2004-280041 A    10/2004
JP     3767255 B2      4/2006
(Continued)

OTHER PUBLICATIONS

Birendra Bahadur, Liquid Crystals Applications and Uses 1990, World Scientific, vol. 1, p. 171.

*Primary Examiner* — Edward J Glick
*Assistant Examiner* — David Y Chung
(74) *Attorney, Agent, or Firm* — Innovation Counsel LLP

(57) ABSTRACT

A display apparatus includes a plurality of pixel units and each pixel unit includes a substrate, a first electrode, a second electrode, an image display part and a protective layer. The first electrode is formed on the substrate. The second electrode is formed over the first electrode while interposing a first insulating layer therebetween to define a TSC (tunnel-shaped cavity) extending in a first direction between the first and second electrodes. The image display part is provided in the TSC to display an image according to an electric field generated by the first and second electrodes. The protective layer covers the second electrode and seals the TSC. The display apparatus having the above structure is manufactured by forming the first electrode, a sacrificial layer and the second electrode and forming the image display part by removing the sacrificial layer.

12 Claims, 19 Drawing Sheets

(56) References Cited

U.S. PATENT DOCUMENTS

| | | |
|---|---|---|
| 5,461,003 A | 10/1995 | Havemann et al. |
| 5,783,338 A | 7/1998 | Cho |
| 5,831,703 A | 11/1998 | Nishiguchi et al. |
| 5,978,062 A | 11/1999 | Liang et al. |
| 5,986,729 A | 11/1999 | Yamanaka et al. |
| 6,141,072 A | 10/2000 | Drabik et al. |
| 6,400,430 B2 | 6/2002 | Nakao |
| 6,469,761 B1 | 10/2002 | Drabik et al. |
| 6,741,321 B2 | 5/2004 | Jeong et al. |
| 6,864,931 B1 | 3/2005 | Kumar |
| 7,123,319 B2 | 10/2006 | Broer et al. |
| 7,522,332 B2 | 4/2009 | Liang |
| 8,629,967 B2 | 1/2014 | Choi et al. |
| 2006/0114404 A1 | 6/2006 | Lin et al. |
| 2007/0109466 A1 | 5/2007 | Choi et al. |
| 2007/0268446 A1 | 11/2007 | Jeng |
| 2008/0030831 A1 | 2/2008 | Wang |
| 2010/0188731 A1 | 7/2010 | Kanematsu |
| 2011/0025935 A1* | 2/2011 | Oka .................. C09K 19/0258 349/33 |

FOREIGN PATENT DOCUMENTS

| | | |
|---|---|---|
| JP | 2006-317896 A | 11/2006 |
| KR | 10-2001-0005935 | 1/2001 |
| KR | 1020010005935 A | 1/2001 |
| KR | 1020040006028 | 1/2004 |
| KR | 10-2005-0060791 A | 6/2005 |
| KR | 1020060031334 A | 4/2006 |
| KR | 1020090059047 A | 6/2009 |
| KR | 1020100073694 A | 7/2010 |
| KR | 10-1172667 | 8/2012 |
| KR | 10-2016-0037150 | 4/2016 |
| WO | 02/100155 A1 | 12/2002 |

* cited by examiner

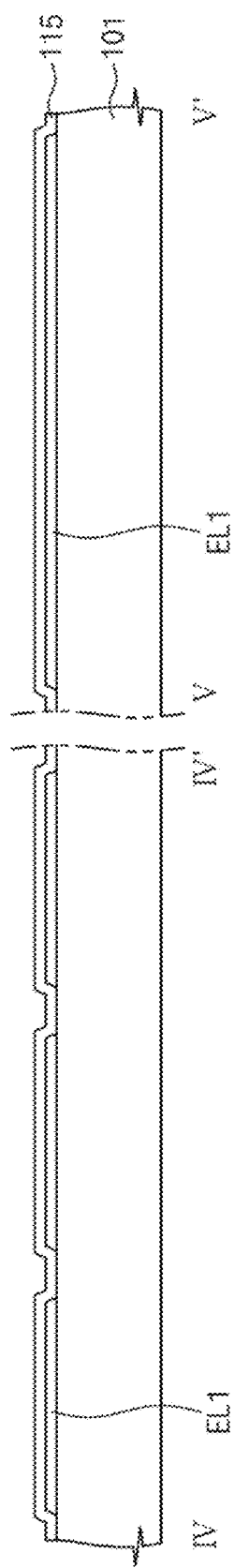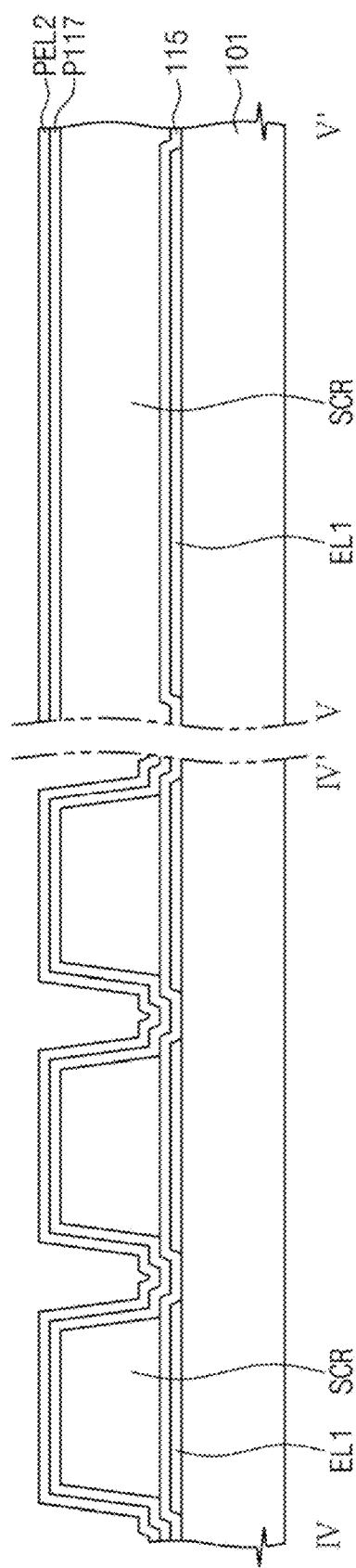

DISPLAY APPARATUS AND MANUFACTURING METHOD THEREOF

CROSS-REFERENCE TO RELATED APPLICATIONS

This application is a continuation application of U.S. patent application Ser. No. 13/089,046 filed on Apr. 18, 2011, which claims priority to Korean Patent Application No. 10-2010-0089056 filed on Sep. 10, 2010 in the Korean Intellectual Property Office, the contents of which are herein incorporated by reference in their entirety.

BACKGROUND

1. Field of Disclosure

The present disclosure of invention relates to a display apparatus and a manufacturing method thereof.

2. Description of Related Technology

Recently, flat-panel display apparatuses, such as liquid crystal displays (LCD's) or electrophoretic displays (EPD's) have been extensively used instead of cathode ray tubes.

The flat panel display apparatus typically includes two differently structured substrates disposed in spaced apart and facing relation opposite to each other. A light controlling part, such as a liquid crystal material layer or an electrophoretic microcapsules layer, may be operatively interposed between the two substrates. The two differently structured substrates are typically aligned and bonded in opposition to each other while leaving a gap therebetween, where the light controlling part (also referred to herein as the image display control part) is disposed in the gap.

In the manufacture of one class of such flat panel display apparatuses, a gap-defining spacer (for example in the shape of a cylinder) is formed on at least one of the two substrates to thus define and maintain the gap between two substrates. An adhesive is typically used to form a bond as between the gap-defining spacer of a first of the substrates and its mating area or partner on the other of the substrates.

Since the first and second differently structured substrates have to be separately manufactured, separately kept in inventory and then brought together as pairs, aligned with each other, spaced apart so that the spacers appropriately mate and bond, the manufacturing process for the display apparatus is complicated by at least all of these various steps.

It is to be understood that this background of the related technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a method of manufacturing a flat panel display apparatus while simplifying the manufacturing process and reducing manufacturing costs and reducing chance of defects.

In one aspect, a display apparatus includes a fluid-fillable tunnel structure extending continuously through at least one of a plurality of pixel units. A fluidic light controlling substance is filled into the fluid-fillable tunnel structure. Each pixel unit may be integrally formed on a base substrate and may include: a first electrode, a second electrode or electrode portion, an image display controlling part disposed in a corresponding portion of a fluid-fillable tunnel structure that snakes through the pixel unit and a protective layer.

In one embodiment, the first electrode is formed on the substrate. The second electrode is formed over the first electrode while interposing a first insulating layer therebetween to define a TSC (tunnel-shaped cavity) extending in a first direction between the first and second electrodes. The image display part is provided in the TSC to display an image according to an electric field generated between the first and second electrodes. The protective layer covers the second electrode and seals closed tunnel ends of the TSC.

The image display part may include a liquid crystal material or an electrophoretic material. The liquid crystal material, if used, may include a nematic liquid crystal, a blue-phase liquid crystal, or a cholesteric liquid crystal.

The display apparatus may further include a black matrix provided on the second electrode. The black matrix may overlap with opposed ends of the first electrode in a second direction perpendicular to the first direction when viewed in a plan view.

The display apparatus may further include a color filter provided between the second electrode and the protective layer. The display apparatus may further include a color filter provided between the substrate and the first electrode.

In another aspect, the display apparatus is manufactured as follows. First, the first electrode is formed on the substrate. Then, the sacrificial layer extending in a first direction is formed on the first electrode. The first insulating layer is formed on the sacrificial layer in a second direction crossing the first direction. After that, the second electrode is formed on the first insulating layer. Then, the sacrificial layer is removed to define the TSC between the first electrode and the first insulating layer. Next, the image display part is filled in as a capillary drawn fluid inside the TSC. Finally, the protective layer is formed to cover the second electrode and to seal the tunnel ends of the TSC.

The sacrificial layer may include an organic material that can be selectively removed by a microwave $O_2$ plasma process.

According to the display apparatus having the above structure, the process of providing and bonding together two differently structured substrates can be omitted. In addition, the number of substrates and the amount of the liquid crystals used in the display apparatus can be reduced as compared with those of the conventional display apparatus. Thus, the manufacturing time and the manufacturing cost for the display apparatus can be remarkably reduced.

BRIEF DESCRIPTION OF THE DRAWINGS

The above and other advantages of embodiments in accordance with the present disclosure will become more readily apparent by reference to the following detailed description when considered in conjunction with the accompanying drawings wherein:

FIGS. 6A, 6B, 6C, 6D, 6E, 6F and 6G are sectional views taken along lines IV-IV' and V-V' of FIGS. 5A to 5E;

FIGS. 8A, 8B and 80C are FIB-SEM (focused ion beam scanning electron microscope) pictures where a sacrificial layer has been removed;

DETAILED DESCRIPTION

Figure 1:
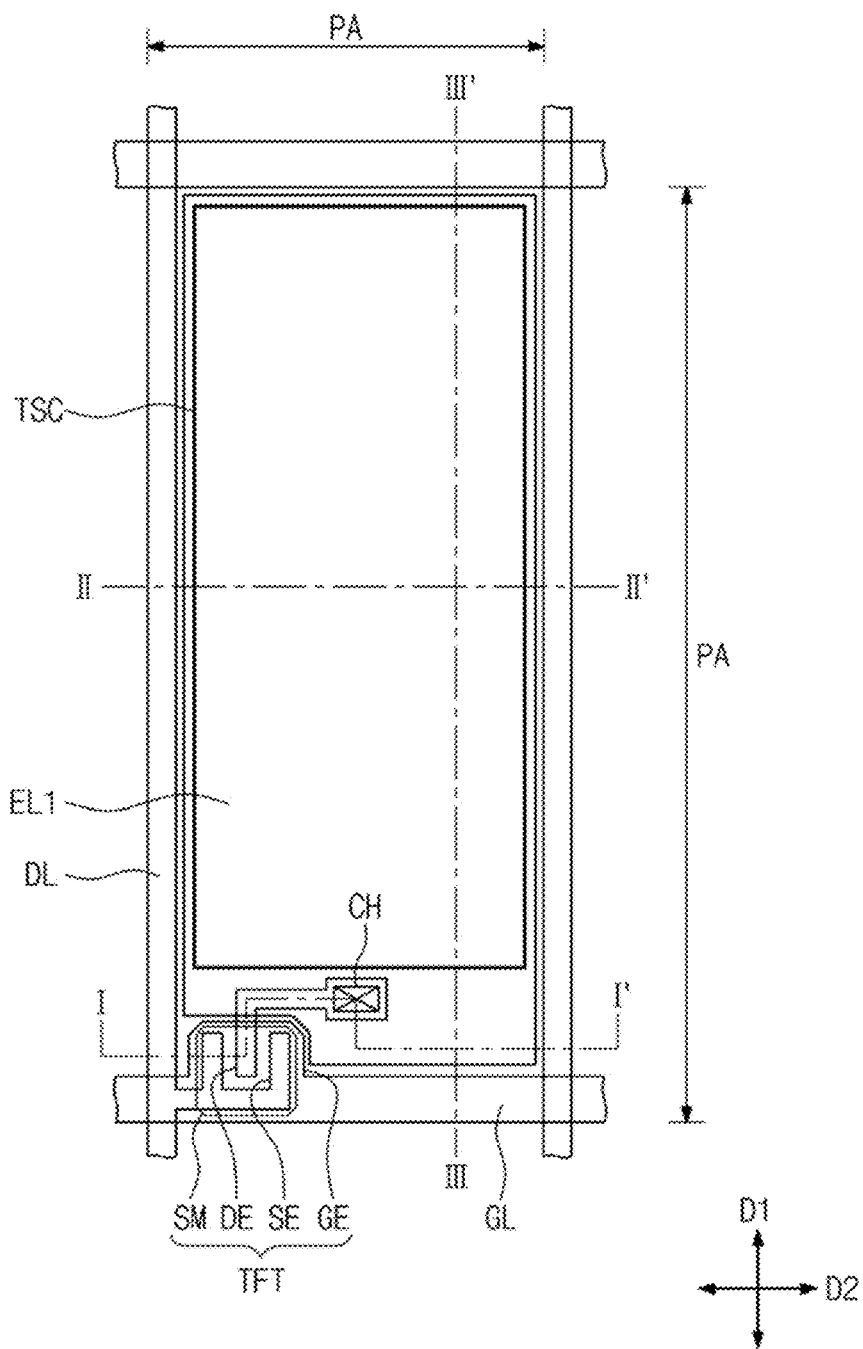
FIG. 1 is a plan view showing a display apparatus according to at least a first embodiment.

Hereinafter, exemplary embodiments in accordance with the present disclosure of invention will be described in detail with reference to accompanying drawings. However, the present teachings are not limited to the exemplary embodiments but instead are intended to include various changes, substitutions and modifications within the technical scope of the present teachings.

In the drawings, the sizes of layers and regions can be magnified for the purpose of clear explanation. The terms "first", "second" and the like can be used to explain various elements but the elements are not limited be such terms. Rather such terms generally are used to distinguish one element from the other element. Thus, an element referred to as a first element in one embodiment can be referred to as a second element in another embodiment. Unless the context otherwise requires, the singular expression may not exclude the plural context.

In the following description, the terms "include" or "comprises" are used to indicate the feature, number, step, operation, elements, parts or combination thereof without excluding other features, numbers, steps, operations, elements, parts or combinations thereof. It will be understood that when an element, such as a layer, a film, a region, or a plate, is referred to as being 'on' or 'under' another element, the element can be directly on another element or intervening element may also be present therebetween. In addition, when an element is referred to as being "directly on" other element, intervening layers may not be present therebetween.

Figure 2:
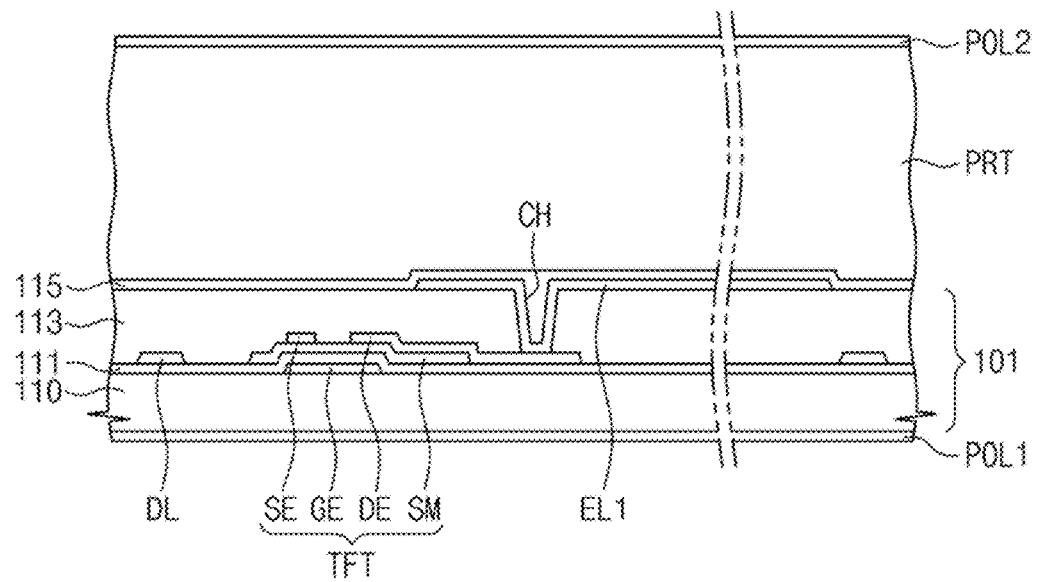
FIG. 2 is a sectional view taken along line I-I' of FIG. 1.
Figure 3:
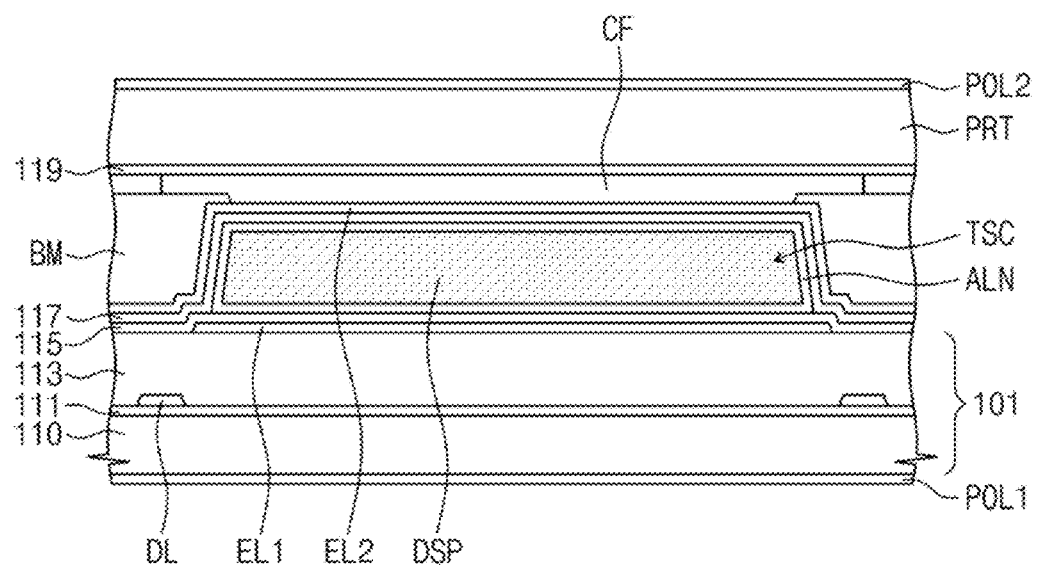
FIG. 3 is a sectional view taken along line II-II' of FIG. 1.
Figure 4:
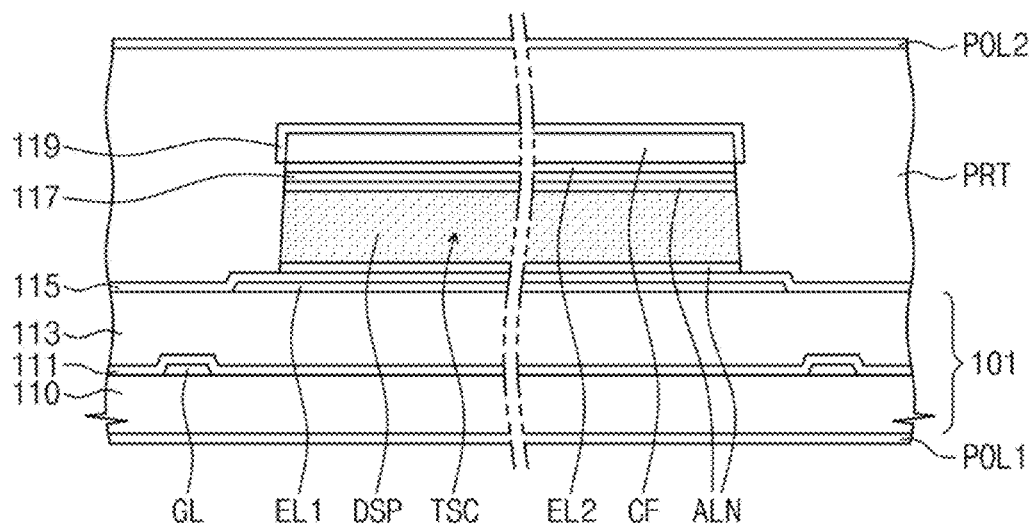
FIG. 4 is a sectional view taken along line III-III' of FIG. 1.

FIG. 1 is a plan view showing a display apparatus according to a first embodiment in accordance with the present disclosure. FIG. 2 is a first sectional view taken along line I-I' of FIG. 1. FIG. 3 is a second sectional view taken along line II-II' of FIG. 1. FIG. 4 is a third sectional view taken along line III-III' of FIG. 1.

Although only one exemplary pixel in one pixel area PA is shown in FIGS. 1 to 3 for the purpose of explanation, it is to be understood that more generally a plurality of such pixels will be provided in corresponding pixel areas PA according to various embodiments in accordance with the present disclosure of invention. The pixel areas PA may be arranged in the form of a matrix having a plurality of columns and a plurality of rows. Since the pixel areas PA of the matrix each have a same repeated structure, only one exemplary pixel area PA will be described below for the purpose of explanation. Although the illustrated pixel area PA has a rectangular shape extending in one direction, the present disclosure is not limited to such a shape or elongation direction. The pixel area PA may have various shapes, such as a V shape or a Z shape.

Referring to FIGS. 1 to 3, the display apparatus according to the first embodiment includes a first substrate 110, electrical wiring, a thin film transistor TFT, a first electrode EL1 (e.g., pixel-electrode), a second electrode EL2 (e.g., common electrode), an image display part DSP (e.g., liquid crystal containing region), and a protective layer PRT.

The substrate 110 may include a light-passing (e.g., transparent) area. A display area portion of the substrate 110 is subdivided into a plurality of pixel areas PA (one shown).

The electrical wiring may include one or more gate lines GL and one or more data lines DL.

The gate line(s) GL extend in one direction (D2) on the substrate 110.

The data line(s) DL insulatively cross with the gate line(s) GL on the substrate 110 while having a first insulating layer 111 interposed therebetween such that the data line(s) DL are insulated from the crossing gate line(s) GL.

At least a first thin film transistor TFT is provided within each pixel area PA and is connected to a corresponding gate line GL and a corresponding data line DL of that pixel area. The at least first TFT includes a corresponding gate electrode GE, a semiconductive layer portion SM, a source electrode SE, and a drain electrode DE.

The gate electrode GE branches integrally from the gate line GL. The semiconductor layer portion SM is formed on the gate line GL while having the first insulating layer 111 interposed therebetween. The source electrode SE integrally branches from the data line DL and partially overlaps with the semiconductor layer SM. The drain electrode DE is spaced apart from the source electrode SE while also partially overlapping with the semiconductor layer SM. The in between region of the semiconductor layer SM, between the source and drain, defines a channel region which can be selectively made conductive so as to thereby provide a switched coupling between the source electrode SE and the drain electrode DE.

The first electrode EL1 is connected to the drain electrode DE. A second insulating layer 113 covers the thin film transistor TFT and is disposed between most of the TFT and the overlying second insulating layer 113 (except for example at the location of the drain contact hole CH). The first electrode EL1 typically covers a major portion of the pixel area PA. According to the illustrated first embodiment, the first electrode EL1 has a substantially solid and rectangular shape, but other embodiments are not so limited. The first electrode EL1 may be provided with various shapes. For instance, the first electrode EL1 may have a plurality of openings defined therethrough so that the first electrode EL1 is seen to include a plurality of stems and a plurality of branches protruding from the stems.

The second insulating layer 113 is formed with a contact hole CH that exposes a part of a top surface of the drain electrode DE. The first electrode EL1 is connected to the drain electrode DE through the contact hole CH.

A third insulating layer 115 is formed on the top surface of the first electrode EL1 to protect the first electrode EL1.

The second electrode EL2 is formed at least partially on the third insulating layer 115. The first and second electrodes EL1 and EL2 may be differently charged so as to generate an electric field between the first and second electrodes EL1 and EL2.

A part of the second electrode EL2 is elevated so as to be spaced apart from the third insulating layer 115 in a manner such that a fluid-fillable and tunnel-shaped cavity (TSC) is defined between the third insulating layer 115 and the elevated part of the second electrode EL2. The fluid-fillable and tunnel-shaped cavity (TSC) has two opposed, major sidewall surfaces when considered in one cross sectional direction and in one embodiment, no sidewall surfaces when considered in a second orthogonal direction. More specifically, when a longitudinal direction of the TSC is referred to as the first direction, D1 and a widthwise direction of the TSC is referred to as the second direction D2, then in one embodiment there are no sidewall surfaces for the fluid-fillable and tunnel-shaped cavity (TSC) when considered along the D1 longitudinal direction and thus the second electrode EL2 is not formed at the sidewall-less ends of the TSC as considered when traveling along the TSC in the first direction D1. In other words, in one embodiment, both ends of the TSC of the illustrated pixel area PA are open in the first direction D1 and are understood to communicate with corresponding open ends of respective TSC's of the vertically adjacent next pixel areas (not shown) such that a fluid containing liquid crystal molecules for example; or electrophoretic microcapsules in another example can be flowed through to thus fill the fluid-fillable and tunnel-shaped cavity (TSC) with the liquid crystal molecules or other appropriate fluid.

A fourth insulating layer 117 is formed so as to undercoat a bottom surface of the second electrode EL2 and thus protect the second electrode EL2. The first electrode EL1 is insulatively spaced apart from the second electrode EL2 at least by the third and fourth insulating layers 115 and 117. Thus, the TSC of the illustrated embodiment is provided substantially between the third and fourth insulating layers 115 and 117.

A fluidic image display part DSP is provided within the TSC so as to be disposed between the first and second electrodes EL1 and EL2.

The fluidic material of the image display part DSP may be used to define a corresponding portion of a to-be-created image under control of the electric field formed between the spaced apart portions of the first and second electrodes, EL1 and EL2. That is, the image display part DSP is structured to control at least one of light transmittance therethrough or light reflection therefrom in accordance with the applied electric field and to thus help form the desired image for display according to the applied electric field. The type of material used for the image display part DSP may include, but is not be limited to, a liquid phase material. For instance, the image display part DSP may include a fluidic electrophoretic material or a liquid crystal material.

If the image display part DSP is of the electrophoretic type, the electrophoretic fluidic material may include an insulating medium and charged particles dispersed in the insulating medium. The insulating medium may serve as a dispersion system that dispersively suspends the charged particles therein. In other words, the insulating medium serves as a dispersion medium. The charged particles may include opposingly charged electrophoretic particles that are dispersed in the insulating medium. The charged particles may be different colored (e.g., black and white, or black and reflective) and may migrate opposingly to top and bottom areas of the TSC as the electric field applied thereacross is modulated to selectively cause blocking of, or reflection of light incident upon the TSC or to selectively cause transmission therethrough or blocking of light attempting to pass through the electrophoretic layer, thereby displaying a desired image.

If the image display part DSP is of the liquid crystal type, the liquid crystal layer may include liquid crystal molecules having an optical anisotropic property. The liquid crystal molecules are driven to different optical attribute states (e.g., light polarization states) as the electric field applied thereacross is modulated so as to cause transmission therethrough or blocking of light attempting to pass through the liquid crystal medium, thereby displaying a desired image.

According to one version of the illustrated embodiment, the image display part DSP is embodied as the liquid crystal material exemplarily.

If the image display part DSP is the fluidic liquid crystal material, where such a material preferably is given an initial optical orientation even when no electric field is present, a liquid crystal alignment layer ALN is optionally formed on the top surface of the third insulating layer 115 and the bottom surface of the fourth insulating layer 117 within the interior of the TSC. The alignment layer ALN is used to pre-tilt molecules of the liquid crystal layer when no electric field is present. The alignment layer ALN may be omitted depending on the type of the liquid crystal used or the structure of the first and second electrodes EL1 and EL2. For instance, if the first electrode EL1 has a micro-slit structure, the alignment layer ALN can be omitted because the liquid crystal layer can be initially aligned without aid of the alignment layer ALN. In addition, if the liquid crystal layer has a reactive mesogen layer for providing the initial alignment, the alignment layer ALN can be omitted.

The protective layer PRT is formed above the second electrode EL2. An appropriately colored, color filter CF may be interposed between the second electrode EL2 and the protective layer PRT. A black matrix, BM and a fifth insulating layer 119 may be interposed between the protective layer PRT and an underneath portion (e.g., EL2) of the substrate.

The color filter CF covers the second electrode EL2. The color filter CF provides a desired color attribute to the light passing through or reflecting from the image display part DSP. The color filter CF may include a selected one of a red color filter R, a green color filter G and a blue color filter B. The color filter CF is located corresponding to each pixel area PA in such a manner that adjacent pixels may have colors different from each other. According to the illustrated first embodiment, the color filters CF do not overlap with each other between adjacent pixels. However, in an alternate embodiment, the color filters CF may partially overlap with each other at a boundary region between adjacent pixel areas PA and the overlapping CF layers of different colors may replace all or part of the black matrix, BM.

Although a first embodiment in accordance with the present disclosure of invention has been described, the present teachings are not limited to the specifics of the first embodiment. For instance, the color filter CF may be omitted depending on the type of image display part DSP used. In detail, if the image display part DSP is to the liquid crystal layer having blue phase liquid crystals or cholesteric liquid crystals, the color filter CF may be omitted. This is because the blue phase liquid crystals or cholesteric liquid crystals can provide the light having a specific wavelength.

The black matrix BM is provided on the second electrode EL2. The black matrix BM is located at an edge of the pixel area PA. The black matrix BM extends in the first direction D1 while overlapping with the data line DL. When viewed in a plan view, the black matrix BM overlaps with both ends of the data line DL in the second direction D2. Although not shown in the drawings, the black matrix BM is formed on the second electrode EL2 and has an extension portion that overlaps with both ends of the first electrode EL1 in the first direction D1.

The black matrix BM blocks fringe light (leakage light) that is unnecessary to forming the displayed image. For instance, the black matrix BM blocks the light leakage occurring at the edge of the image display part DSP caused by the abnormal behavior of the liquid crystal molecules or the color mixture occurring at an edge of the color filter CF. The extension portion is a region corresponding to a contact region between the image display part DSP and the protective layer PRT. The extension portion blocks the light leakage occurring in the contact region.

The fifth insulating layer 119 extends in the second direction D2. The fifth insulating layer 119 covers the entire color filter CF. When viewed in a sectional view, a lateral side (sidewall) of the color filter CF is covered with the fifth insulating layer 119.

The protective layer PRT covers the entire surface of the pixel unit as formed on the substrate 110 and further covered by the fifth insulating layer 119. The protective layer PRT is deposited after the fluidic material of the image display part DSP is filled into the TSC and thus the deposited protective layer PRT closes up one or both of the openings of the TSC to thus seal the fluidic material inside the TSC. That is to say, after the protective layer PRT is deposited, the TSC is fully sealed by the first electrode EL1, the second electrode EL2 and the protective layer PRT. When viewed in a sectional view, the protective layer PRT makes contact with the image display part DSP, the lateral side of the fourth insulating layer 117, the lateral side of the second electrode EL2 and the fifth insulating layer 119. Additionally, the protective layer PRT planarizes the top of the single substrate structure.

If the image display part DSP includes the liquid crystal layer, polarizing plates are optionally provided on the bottom surface of the substrate 110 and/or on the top surface of the protective layer PRT, respectively. The polarizing plate provided on the bottom surface of the substrate 110 will be referred to here as a first polarizing plate POL1 and the polarizing plate provided on the top surface of the protective layer PRT will be referred to as a second polarizing plate POL2. In this case, the first polarizing plate POL1 may have a first linear polarization axis that is perpendicular to a corresponding second linear polarization axis of the second polarizing plate POL2.

It may be appreciated from the above that a complete display apparatus can be formed with just a single substrate (110) rather than needing two different structured and accurately spaced apart substrates. Moreover, the fluidic material inside the TSC is not wastefully provided under all black matrix areas. Accordingly, the number of substrates (110) used and the amount of the liquid crystals used in the display apparatus having the above structure can be reduced by about a half as compared with those of the conventional, two substrate and fully fluid filled display apparatus.

FIGS. 5A to 5E are plan views showing a procedure of manufacturing the display apparatus according to the first embodiment. In the example of FIGS. 5A-5E, three adjacent pixel areas PA are illustrated as an example. FIGS. 6A to 6F are sectional views taken along lines IV-IV' and V-V' of FIGS. 5A to 5E. For the purpose of convenience, the elements encompassed from the level of the base substrate 110 up to and including the second insulating layer 113, which elements are shown in FIGS. 1 to 4 will be omitted in FIGS. 5A to 5E and FIGS. 6A to 6F and detailed description of these already described elements will also be omitted. The following description will be made on the assumption that the above elements have been pre-formed on what is referred to here as the base insulated substrate 101/113. Hereinafter, a procedure of manufacturing the display apparatus according to the first embodiment will be described with reference to FIGS. 5A to 5E and FIGS. 6A to 6F.

Figure 5A:
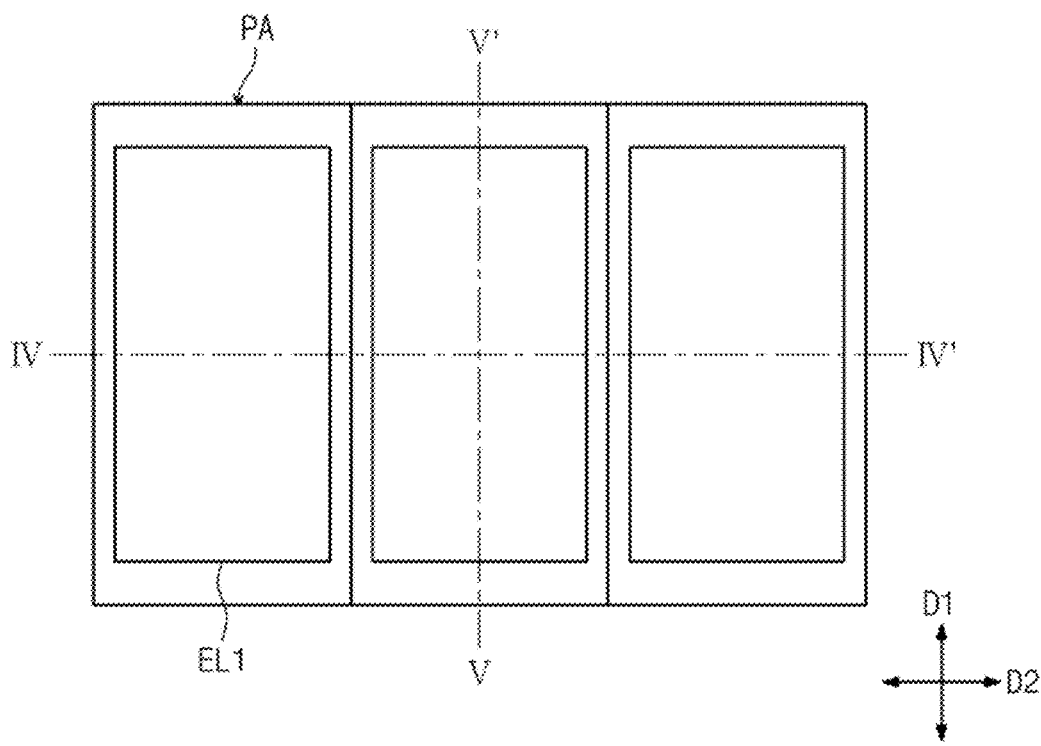
FIGS. 5A, 5B, 5C, 5D and 5E are plan views showing a procedure of manufacturing a display apparatus according to the first embodiment of FIG. 1.

Referring to FIGS. 5A and 6A, the first electrode EL1 is formed on the base insulated substrate 101/113. The first electrode EL1 may include a transparent conductive material, such as ITO (indium tin oxide) or IZO (indium zinc oxide). The first electrode EL1 can be formed by forming a first conductive layer on the entire surface of the base substrate 101/113 with the transparent conductive material and then patterning the first conductive layer through an appropriate photolithography process.

Then, the third insulating layer 115 is formed to cover the first electrode EL1. The third insulating layer 115 may include an inorganic insulating material, such as SiNx or SiOx.

Figure 5B:
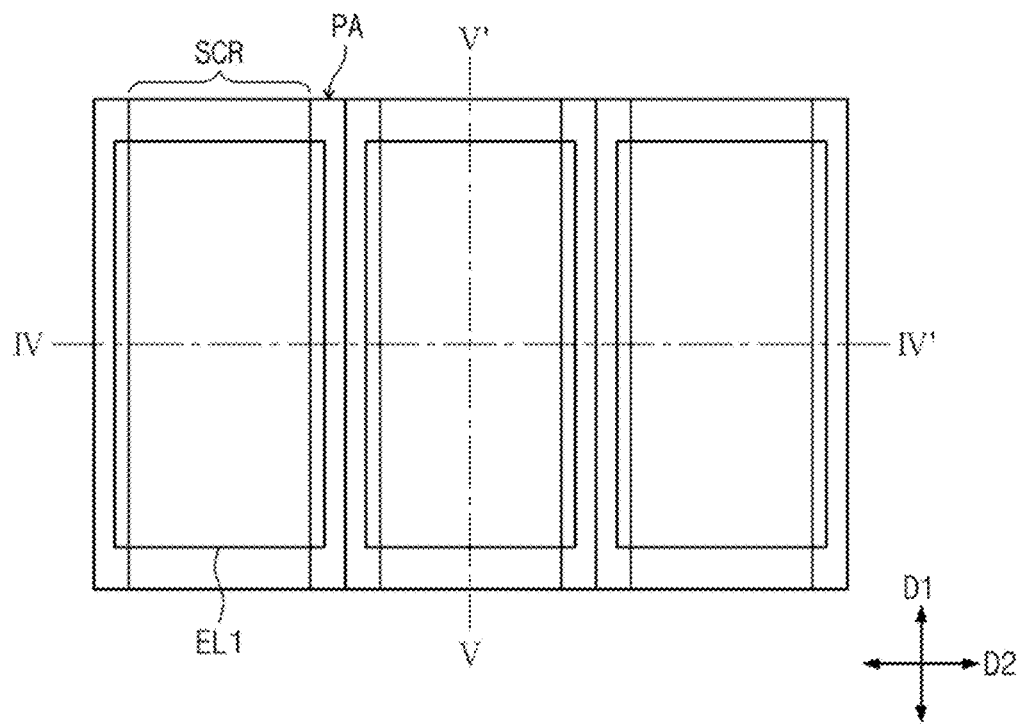

Referring to FIGS. 5B and 6B, a sacrificial layer SCR is formed on the third insulating layer 115. The sacrificial layer SCR of this embodiment has elongated ribs that extend in the first direction D1 of FIGS. 5A-5D so as to later form three fluid-fillable tunnel structures extending continuously and vertically (in the D1 direction) through the illustrated plurality (e.g., 3) of R, G and B pixel units. In one embodiment, the sacrificial layer SCR is formed with an organic polymer material that may be later removed according to an analog of the lost wax process. The organic polymer material may include BCB (benzocyclobutene) and acryl-based resin, but the present teachings are not limited thereto.

The sacrificial layer SCR is formed in a region where the image display part is formed later with a width and a height corresponding to a width and a height of the TSC. The sacrificial layer SCR may not be formed at both edges of the pixel area PA which edges extend in the first direction D1. The sacrificial layer SCR is removed in the subsequent process to thereby form the fluid-fillable TSC.

Figure 5C:
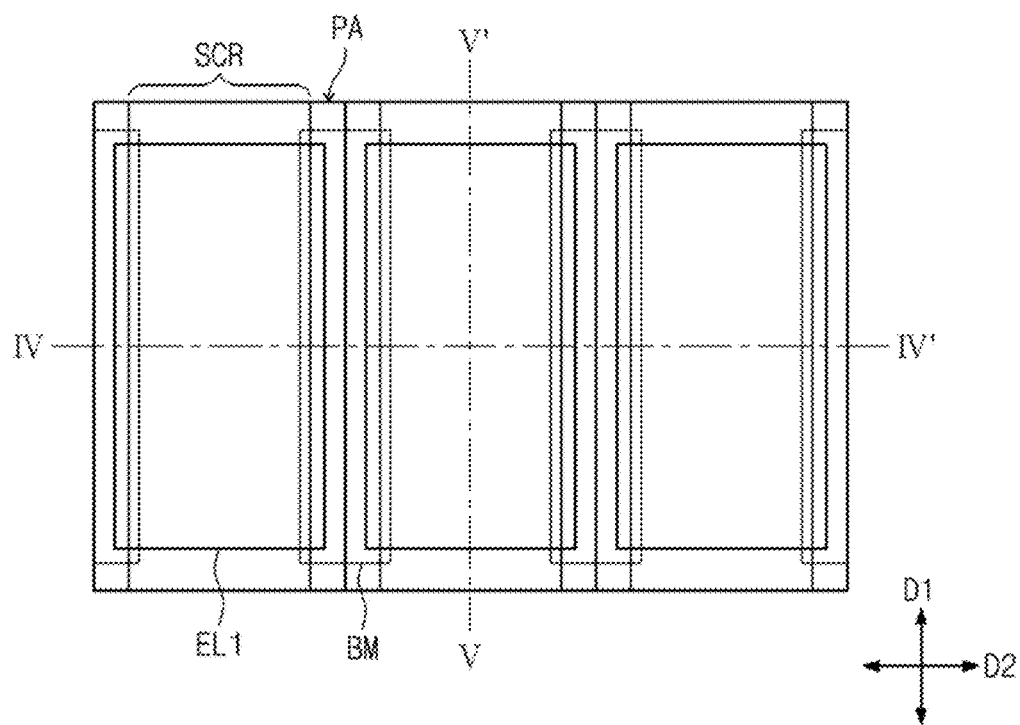
Figure 6C:
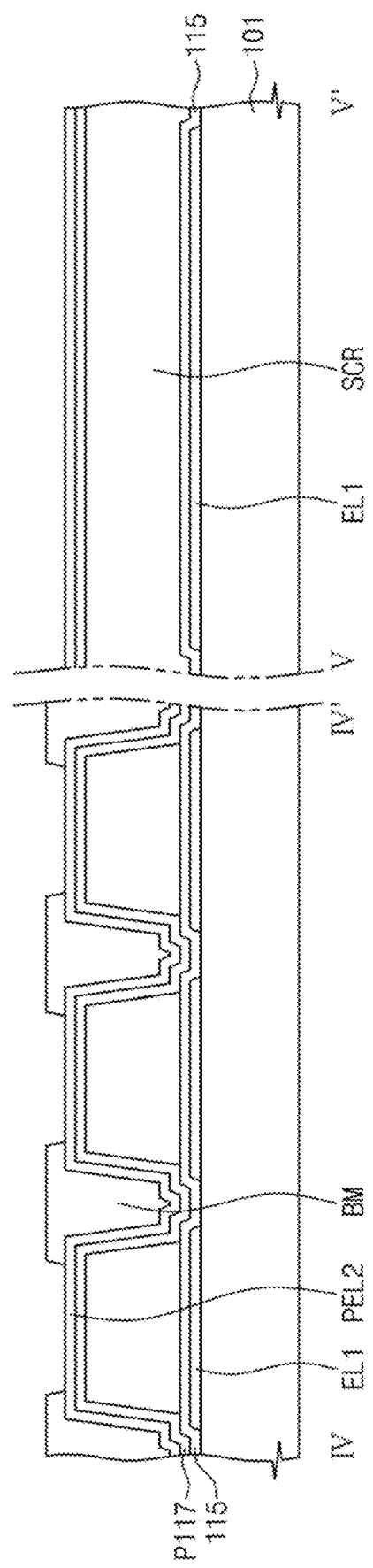

Referring to FIGS. 5C and 6C, a preliminary fourth insulating layer P117 and a second conductive layer PEL2 are sequentially formed on the base substrate 101 having the sacrificial layer SCR. The preliminary fourth insulating layer P117 may include an inorganic insulating material, such as SiNx or SiOx. The second conductive layer PEL2 may include a transparent conductive material, such as ITO or IZO.

Then, as seen in FIG. 6C, the black matrix BM is formed on the base substrate 101/113 having the second conductive layer PEL2 formed thereon. The black matrix BM is located at the edges of the pixel area PA. When viewed from the top, a portion of the black matrix BM extends in the first direction D1 while overlapping with the data line DL. In addition, another portion of the black matrix BM overlaps with both ends of the data line DL in the second direction D2 when viewed from the top. The black matrix BM is formed on the preliminary second electrode PEL2 and has an extension portion overlapping with both ends of the first electrode EL1 aligned in the first direction D1.

The black matrix BM can be formed by depositing a light blocking material on the second conductive layer PEL2 and then patterning the light blocking material through the photolithography process.

Figure 5D:
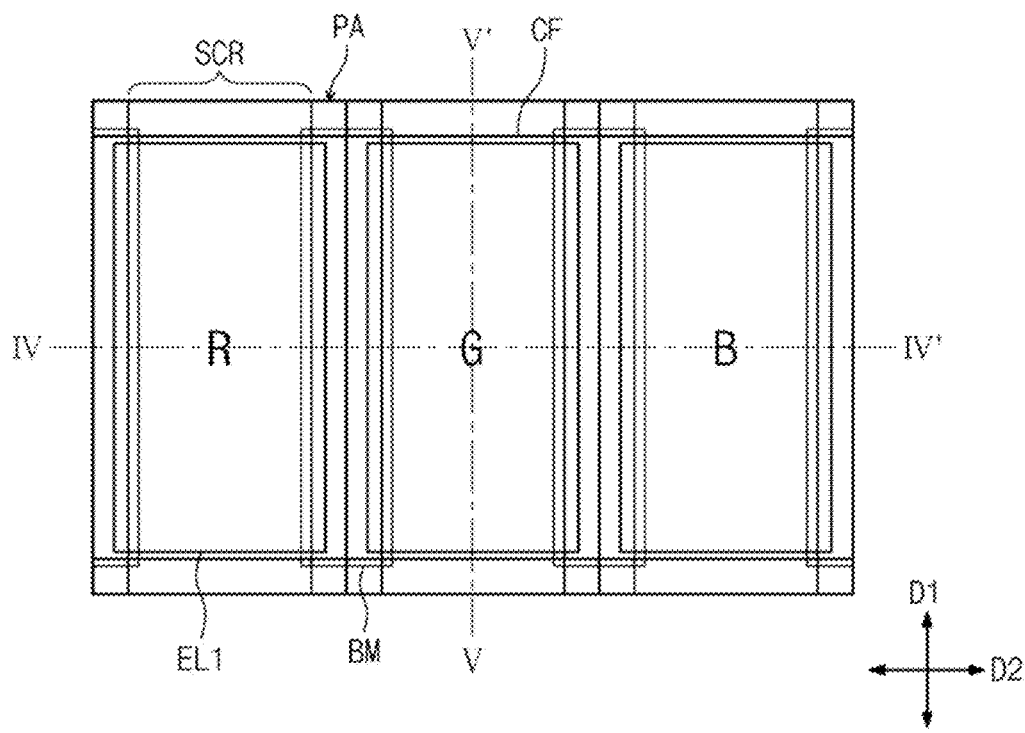
Figure 6D:
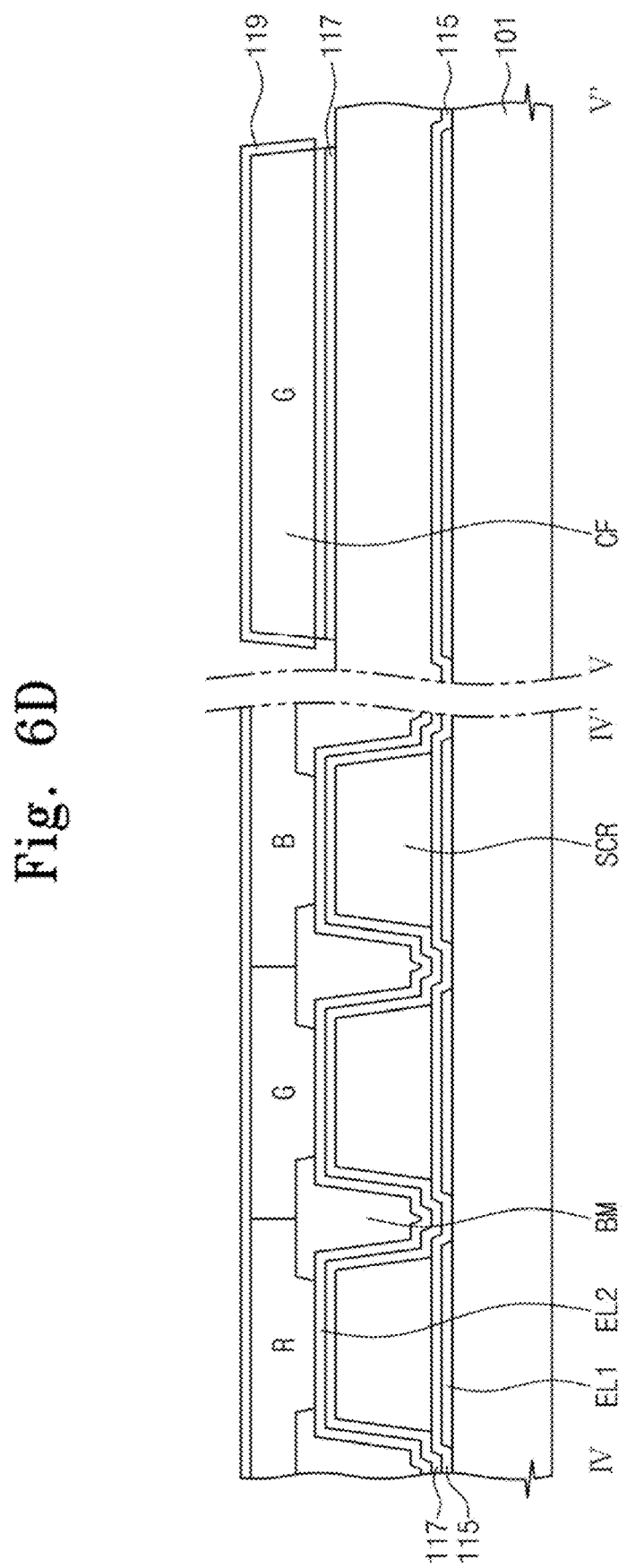

Referring to FIGS. 5D and 6D, the color filters CF (e.g., R, G, B) are formed on the second conductive layer PEL2 and the black matrix BM. The respective color filters CF each covers a respective region where the corresponding second electrode EL2 is formed later. The color filter CF is not formed at both ends of the pixel area PA in the first direction D1. The color filter CF may include a red color filter R, a green color filter G and a blue color filter B. The color filter CF may include an organic polymer material. In addition, the color filter CF can be formed through the photolithography process by using a photoresist polymer material. In addition, the color filter CF can be formed through an inkjet process.

According to the illustrated first embodiment, the color filters CF may not overlap with each other between adjacent pixels as an example. However, the color filters CF may partially overlap with each other at a boundary region between adjacent pixel areas PA in an alternate embodiment. The color filter CF is located corresponding to each pixel area PA in such a manner that adjacent pixels may have colors different from each other.

A preliminary fifth insulating layer 119 can be formed on the color filter CF by forming an inorganic insulating material on the entire surface of the base substrate 101/113. The inorganic insulating material may include SiNx or SiOx. After the color filter CF and the preliminary fifth insulating layer 119 are formed, the preliminary fifth insulating layer, the second conductive layer PE2, and the preliminary fourth insulating layer P117 are etched to form the fifth insulating layer 119, the second electrode EL2, and the fourth insulating layer 117. The fifth insulating layer 119, the second electrode EL2, and the fourth insulating layer 117 extend in the second direction D2, and are not formed at the ends of the pixel area PA in the first direction D1. Thus, the top surface of the sacrificial layer SCR corresponding to the ends of the pixel area PA can be exposed.

When viewed in a sectional view, the fifth insulating layer 119 surrounds the both ends of the color filter CF. To this end, the length of the fifth insulating layer 119 is longer than the length of the color filter CF in the first direction D1 when viewed in a plan view. As a result, when viewed in a sectional view, the lateral sides of the color filter CF are fully surrounded by the fifth insulating layer 119. The fifth insulating layer 119 serves as a protective layer that prevents the color filter CF, which is an organic layer, from being etched away in a subsequent process that selectively removes the sacrificial layer SCR.

Figure 5E:
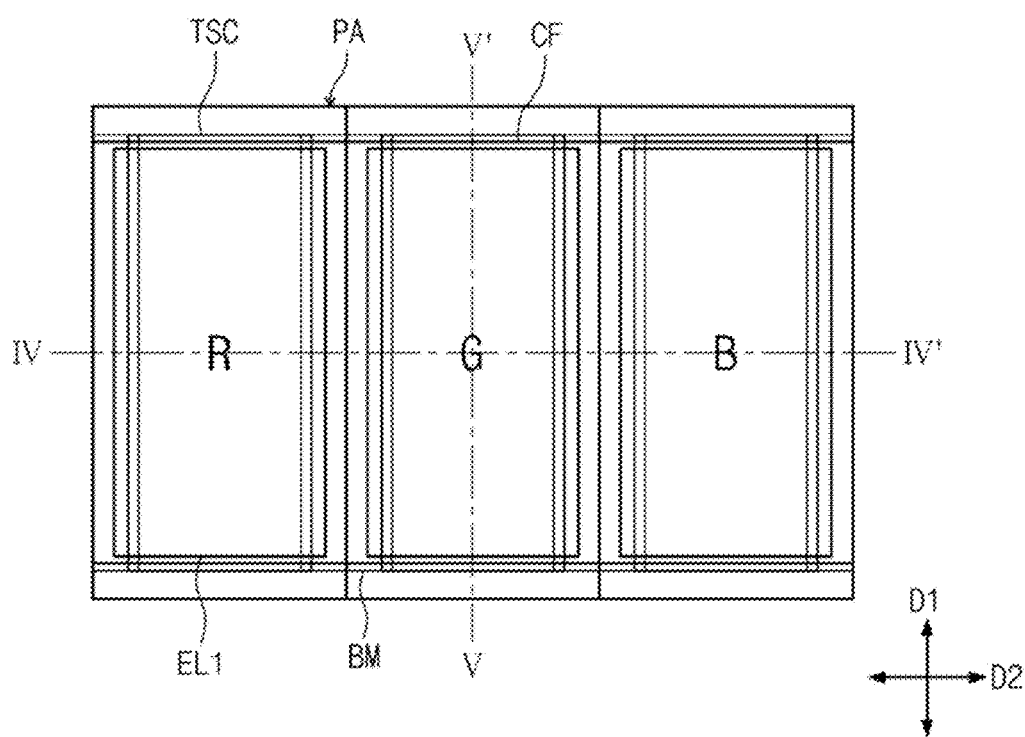
Figure 6E:
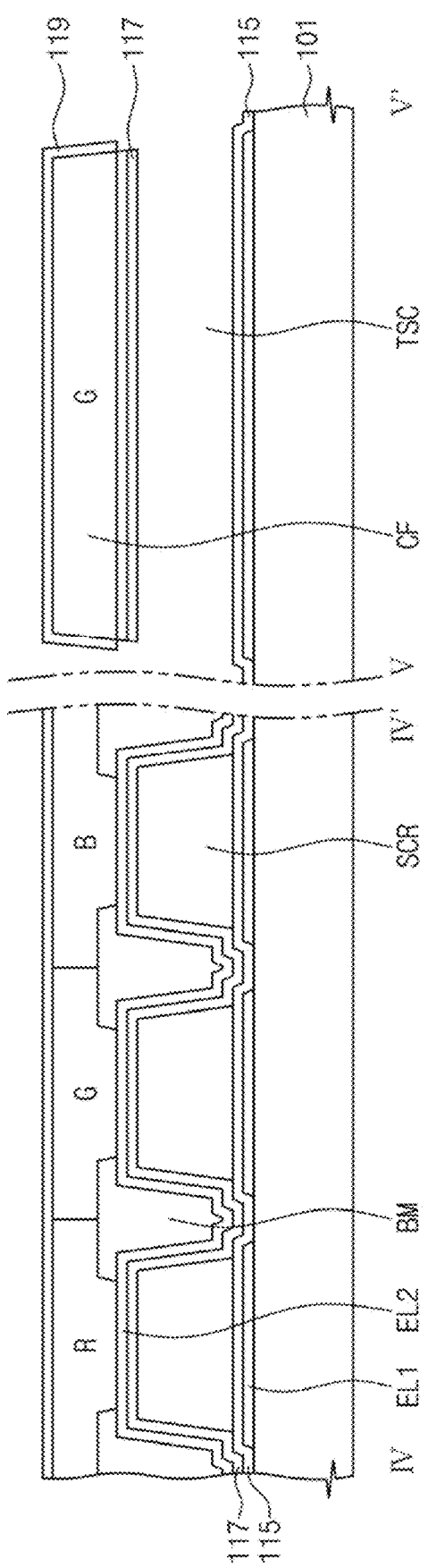

Referring to FIGS. 5E and 6E, the sacrificial layer SCR is removed through a plasma process, so that the hollow interior of the TSC is formed. The sacrificial layer SCR is sequentially etched from the exposed top surface of the sacrificial layer SCR to the interior of the TSC through an isotropic plasma etching process. Thus, the both ends of each pixel area PA in the first direction D1 and the top surface of the third insulating layer 115 corresponding to the interior of the TSC can be exposed. In addition, the bottom surface of the fourth insulating layer 117 corresponding to the interior of the TSC can be exposed.

Various types of plasma processes can be carried out if the organic layer of the sacrificial layer SCR can be isotropically removed through the plasma processes. For instance, a microwave $O_2$ plasma process can be employed. According to the microwave $O_2$ plasma process, the etching conditions, such as the stage temperature, the chamber pressure and the type of gas, can be adjusted such that the organic insulating materials of the sacrificial layer SCR are exclusively etched. Thus, the third to fifth insulating layers 115, 117 and 119, which are formed by using the inorganic insulating materials, may not be etched. The sacrificial layer SCR may be selectively etched away through the microwave $O_2$ plasma process under the etching conditions of the stage temperature of the etching chamber of 100° C. to 300° C., $O_2$ flow rate of 5000 sccm to 10000 sccm, $N_2H_2$ flow rate of 100 sccm to 1000 sccm, chamber pressure of 2 Torr, and power of 100 W to 4000 W, for an example.

FIGS. 7A to 7E are microphotographs sequentially showing the procedure of removing the sacrificial layer SCR from the outer ends and inwardly by using microwave $O_2$ plasma. FIGS. 7A to 7E show the substrate 110 upon the etching time of 4 min, 8 min, 12 min, 18 min, and 20 min, respectively. Referring to FIGS. 7A to 7E, when viewed in a plan view, each pixel area PA has a rectangular shape and the sacrificial layer SCR having a rectangular shape is formed in each pixel area PA. In the rectangular sacrificial layer SCR, the long lateral side corresponds to the first direction D1 and the short lateral side corresponds to the second direction D2.

Referring to FIGS. 7A to 7E, since the microwave $O_2$ plasma isotropically etches the sacrificial layer SCR, the sacrificial layer SCR is sequentially etched from the end of the sacrificial layer SCR exposed in the first direction D1 to the interior of the TSC. As a result, when 20 minutes has elapsed after the microwave $O_2$ plasma etching, the sacrificial layer SCR is completely removed.

Figure 8A:
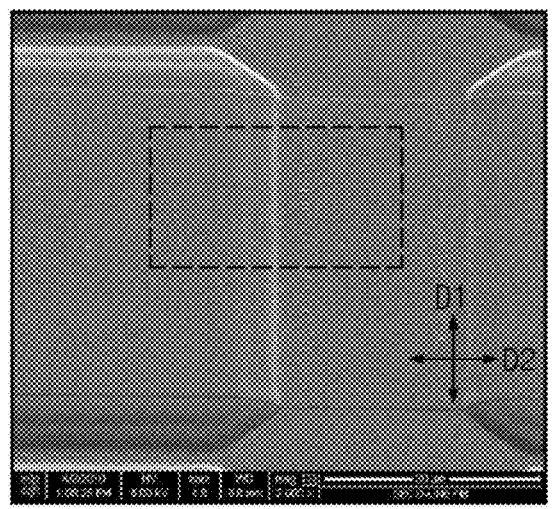
Figure 8B:
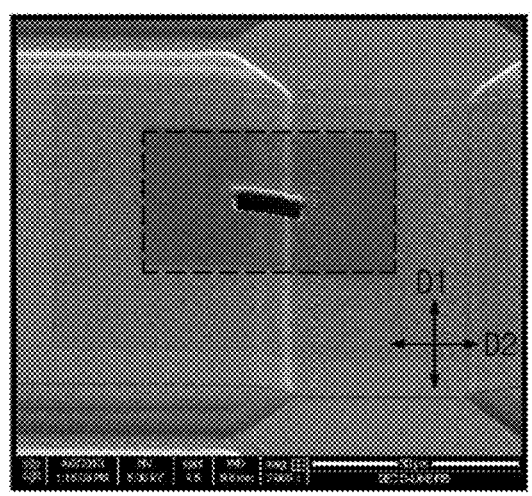
Figure 8C:
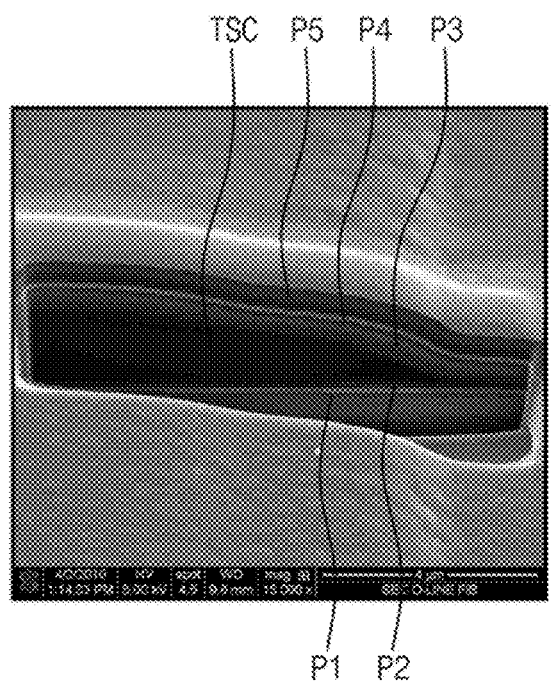

FIGS. 8A to 8C are FIB-SEM (focused ion beam scanning electron microscope) pictures where the sacrificial layer has been removed, in which FIG. 8A shows the analysis position in the base substrate 101, FIG. 8B shows the analysis position which is partially sectioned, and FIG. 8C shows an enlarged section part. The analysis position is represented with dotted lines in FIG. 8A, and the section part is formed in a region corresponding to one end of each pixel PA in the second direction in FIG. 8B. These pictures are intended to confirm the removable of the sacrificial layer SCR, so the color filter CF is omitted in this verification version (verifying that the SCR is selectively and substantially fully removed). Thus, the fourth insulating layer 117 is formed on the sacrificial layer SCR, and the fifth insulating layer 119 is directly formed on the fourth insulating layer 117 without the color filter CF. In FIG. 8C, the first electrode EL1, the third insulating layer 115, the fourth insulating layer 117, the second electrode layer EL2, and the fifth insulating layer 119 are represented as P1, P2, P3, P4 and P5, respectively.

Referring to FIGS. 8A to 8C, the TSC is formed between the third insulating layer 115 and the fourth insulating layer 117, i.e. P3.

Figure 6F:
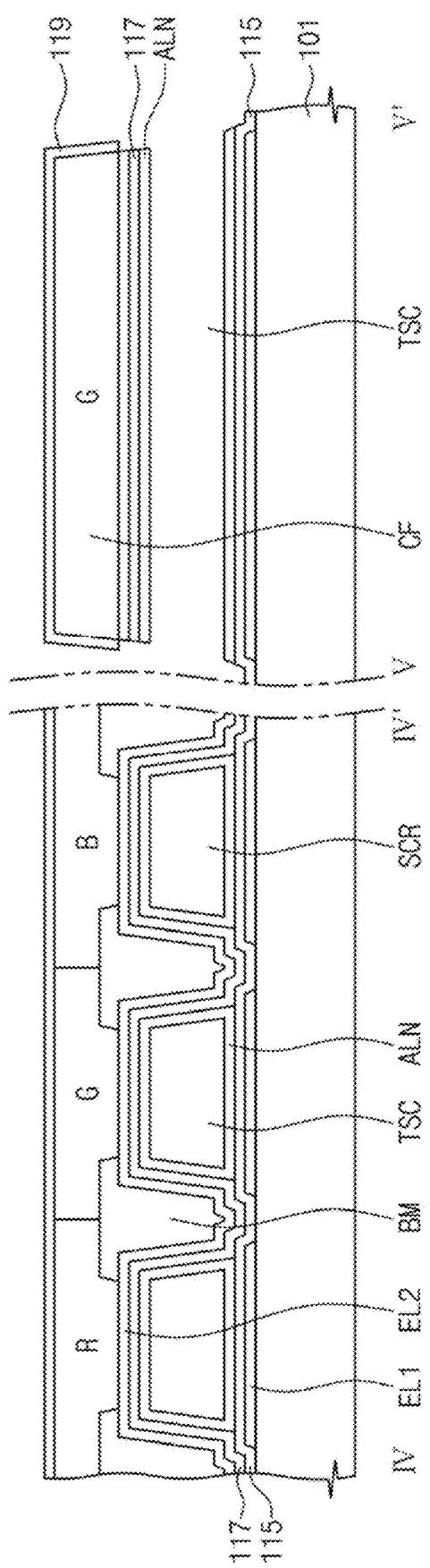

In addition, referring to FIGS. 5E and 6F, the alignment layer ALN is formed in the TSC after the sacrificial layer SCR has been removed. In detail, the alignment layer ALN is formed on the top surface of the first insulating layer 111 and the bottom surface of the second insulating layer 113 formed in the TSC. The alignment layer ALN can be formed with a below room-temperature pre-cooled alignment liquid which contains an alignment material, such as polyimide, mixed with an appropriate solvent. The liquid-phase alignment material is provided in the form of a fluid, the liquid-phase alignment material may migrate into the TSC when the liquid-phase alignment material is supplied in the vicinity of the TSC due to the capillary action. The alignment liquid can be supplied in the vicinity of the TSC through an inkjet scheme by using a micropipette, or supplied into the TSC by using a vacuum injection device. After that, the solvent is removed. In order to remove the solvent, in one embodiment, the substrate 100 is subject to the room temperature or higher heat is applied to the substrate 100.

The alignment layer ALN may be omitted depending on the type of the liquid crystal or the structure of the first and second electrodes EL1 and EL2. For instance, if the first electrode and second electrodes EL1 and EL2 are patterned in a predetermined shape, the alignment layer ALN can be omitted.

Figure 6G:
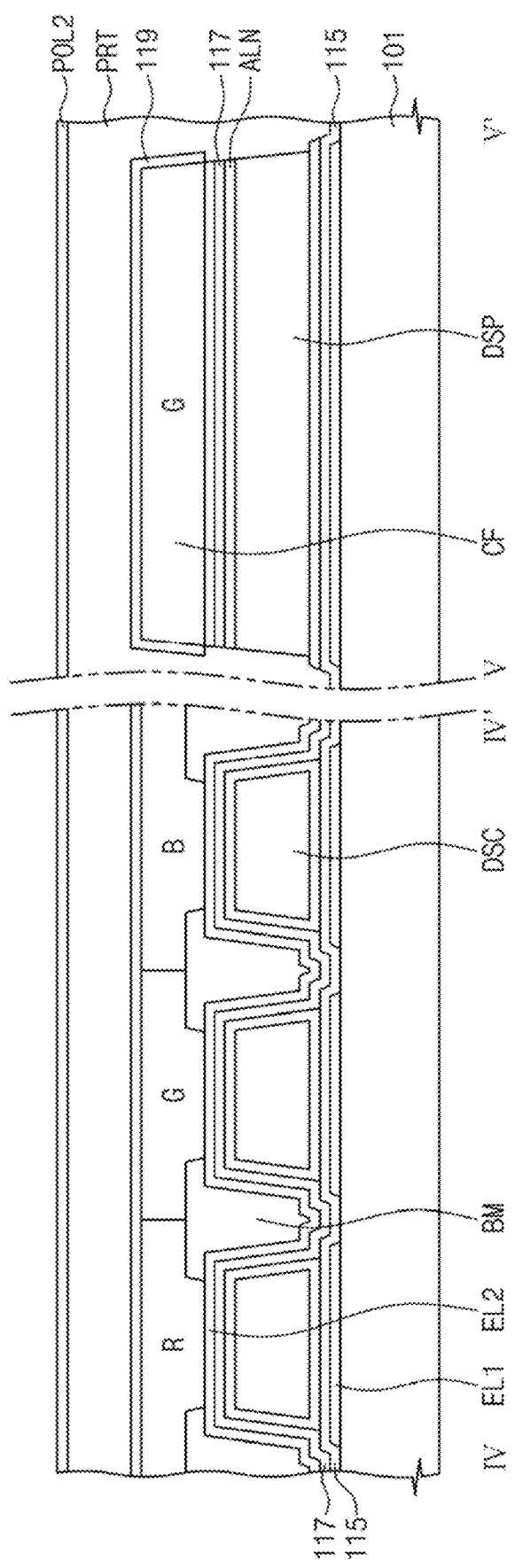
Figure 7A:
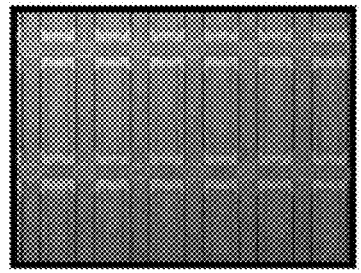
FIGS. 7A, 7B, 7C, 7D and 7E are microphotographs sequentially showing a procedure of removing a sacrificial layer by using a microwave $O_2$ plasma.
Figure 7B:
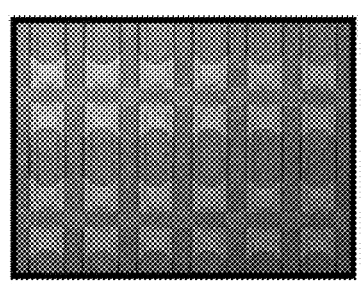
Figure 7C:
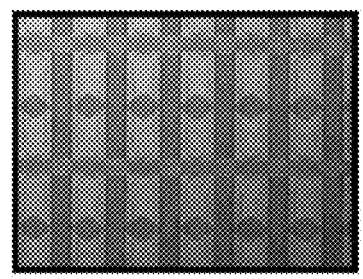
Figure 7D:
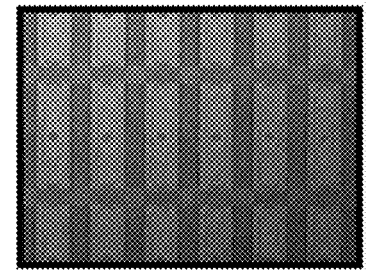
Figure 7E:
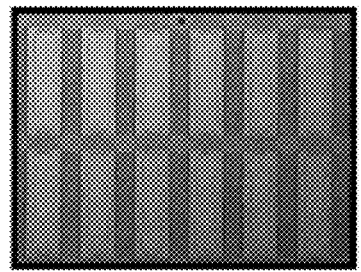

Referring to FIGS. 5E and 6G, the image display part DSP including the liquid crystal is introduced into the TSC where the alignment layer ALN is pre-formed. Since the liquid crystal is provided in the form of a fluid, the liquid crystal may migrate into the TSC when the liquid crystal is supplied in the vicinity of the TSC due to capillary action. The liquid crystal can be supplied in the vicinity of the TSC through an inkjet scheme by using a micropipette, or supplied into the TSC by using a vacuum injection device. When the liquid crystal is supplied into the TSC by using the vacuum injection device, if a part of the base substrate 101 including the TSC is immersed in a container filled with liquid crystals and provided in a chamber while and the pressure of the chamber being lowered by the vacuum injection device, so that the liquid crystal is supplied into the TSC due to the capillary action.

Then, the liquid crystal is removed except for the liquid crystal formed inside (whetted inside, trapped inside by capillary forces) the TSC, so that the protective layer PRT is formed to surround and seal the TSC. The protective layer PRT seals the opening of the TSC, that is, the inlet of the TSC through which the liquid crystal is injected.

In one embodiment, the protective layer PRT is formed by using a semi-cured polymer material. The polymer material has a predetermined fluidity (viscosity) before the polymer material has been completely cured. In order to form the protective layer PRT, the polymer material is formed in a plate-shape having a predetermined thickness such that the polymer material can cover the base substrate 101. Then, the plate-shape polymer material is placed on the base substrate 101 and pressure is applied onto the plate-shape polymer material. Since the polymer material has the predetermined fluidity, the polymer material can be provided even in the recess formed in the base substrate 101. That is, the polymer material makes contact with the top surface of the fifth insulating layer 119, the top surface of the end of each pixel PA of the first insulating layer 111 exposed in the first direction dl, the lateral side of the liquid crystal, the lateral side of the second insulating layer 113 and the lateral side of the second electrode EL2.

After the protective layer PRT has been formed (e.g., cured), the first polarizing plate POL1 is provided on the bottom surface of the base substrate 101 and the second polarizing plate POL2 is provided on the top surface of the protective layer PRT. The polarizing plates are provided to polarize the light passing through the liquid crystal layer. The transmission axis of the first polarizing plate POL1 may be perpendicular to the transmission axis of the second polarizing plate POL2.

The second polarizing plate POL2 can be provided on the protective layer PRT by using an adhesive. In addition, the second polarizing plate POL2 can be directly attached to the protective layer PRT without the adhesive. In this case, the protective layer PRT may include a polymer material having adhesive property relative to the second polarizing plate POL2.

After the protective layer PRT has been formed on the base substrate 101, the second polarizing plate POL2 is formed on the protective layer PRT, but the embodiment is not limited thereto. For instance, the protective layer PRT and the second polarizing plate POL2 can be simultaneously provided by forming the adhesive polymer material layer on the second polarizing plate POL2 and then pressing the adhesive polymer material layer and the second polarizing plate POL2 toward the base substrate 101 having the liquid crystal layer.

The first polarizing plate POL1 is attached to a bottom surface of the base substrate 101 for example by using an adhesive.

The display apparatus manufactured through the above method can reduce the manufacturing time and the manufacturing cost as compared with the conventional display apparatus because the process of forming and combining two differently structured substrates can be omitted. In addition, different from the conventional liquid crystal display, in which the spacer must be formed before the two substrates are combined with each other to adjust the gap between two substrates, embodiments in accordance with the present disclosure can omit the spacer. Thus, the process to form the spacer can be omitted, so that the manufacturing time and the manufacturing cost may be further reduced.

Figure 9:
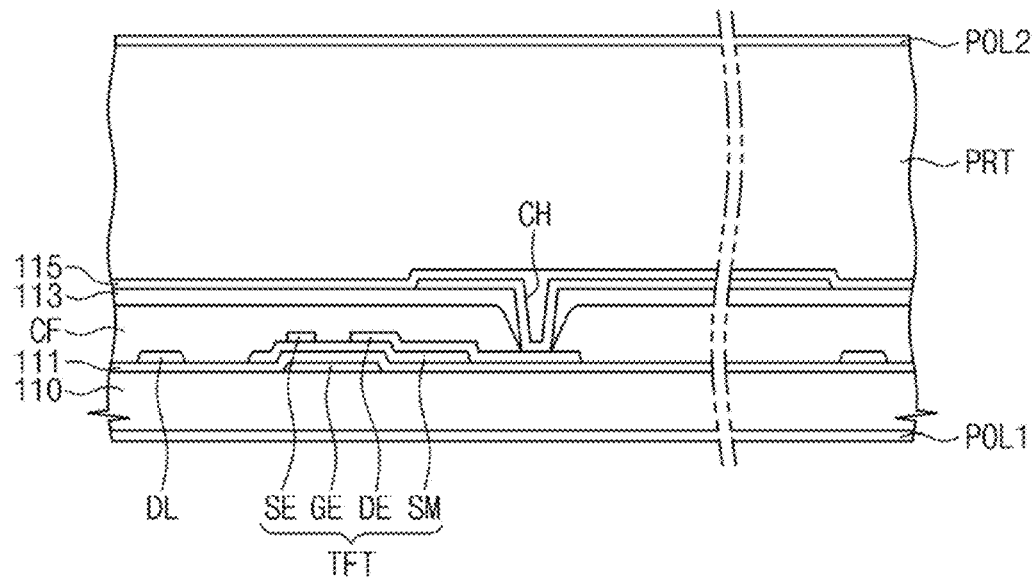
FIG. 9 is a sectional view showing a display apparatus according to the second embodiment of the present invention taken along line I-I' of FIG. 1.
Figure 10:
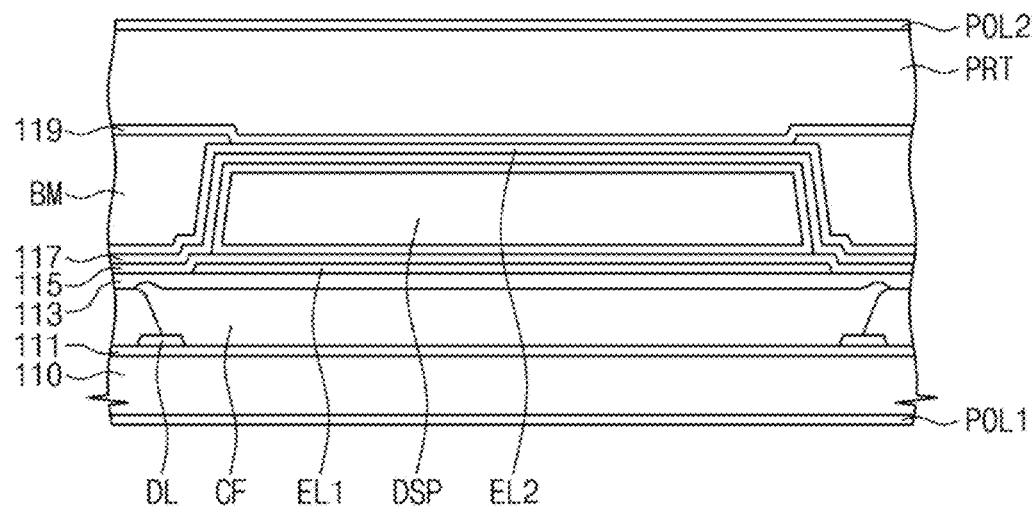
FIG. 10 is a sectional view showing a display apparatus according to a second embodiment and as taken along line II-II' of FIG. 1.
Figure 11:
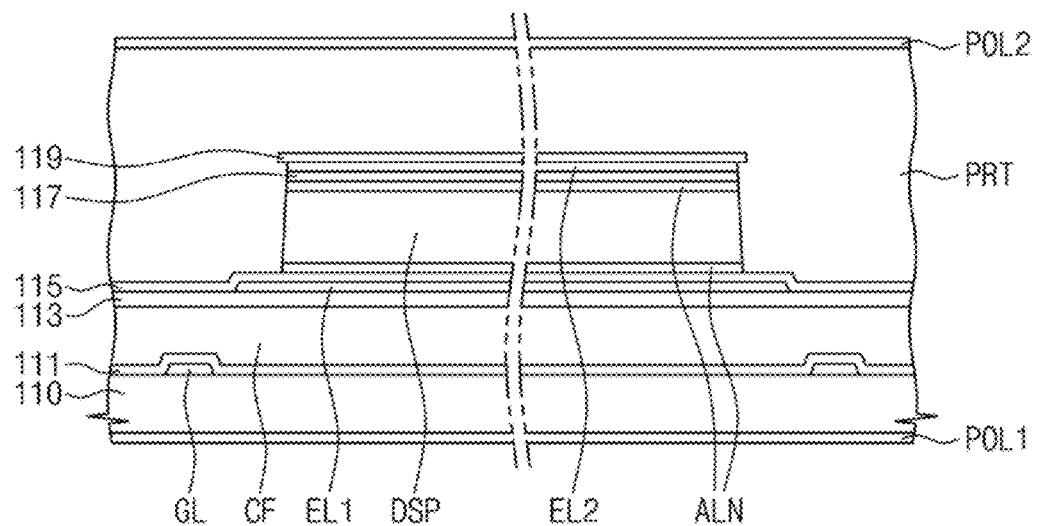
FIG. 11 is a sectional view showing a display apparatus according to the second embodiment and as taken along line III-III' of FIG. 1.

FIGS. 9 to 11 are sectional views showing a part of a display apparatus according to a second embodiment in accordance with the present disclosure. The plan view of the display apparatus according to the second embodiment is identical to the plan view of the display apparatus according to the first embodiment shown in FIG. 1, so the plan view of the display apparatus according to the second embodiment will be omitted. FIG. 9 is a sectional view taken along line I-I' of counterpart FIG. 1, FIG. 10 is a sectional view taken along line II-II' of FIG. 1, and FIG. 11 is a sectional view taken along line III-III' of FIG. 1.

The following description will be focused on the difference with respect to the first embodiment in order to avoid redundancy. In addition, the same or similar reference numerals will be used to refer to the same or similar elements.

In the display apparatus according to the second embodiment, the color filter CF is provided between the thin film transistor TFT and the first electrode EL1. That is, the display apparatus according to the second embodiment of the present invention corresponds to a COT (color filter on transistor) type display apparatus.

Referring to FIGS. 9 to 11, the display apparatus according to the second embodiment of the present invention includes a base substrate 110, a wiring, a thin film transistor TFT, a color filter CF, a first electrode EL1, a second electrode EL2, an image display part DSP, and a protective layer PRT.

The substrate 110, the wiring and the thin film transistor TFT are substantially identical to those of the first embodiment.

The color filter CF is provided on the substrate 110 having the thin film transistor TFT. That is, the color filter CF is formed on the data line DL and the thin film transistor TFT to cover the data line DL and the thin film transistor TFT. The color filter CF may include a selected one of a red color filter R, a green color filter G and a blue color filter B. The color filter CF is located corresponding to each pixel area PA in such a manner that adjacent pixels may have colors different from each other. As shown in FIG. 10, ends of color filters CF between adjacent pixels may overlap with each other by taking the misalign margin in the manufacturing process into consideration. According to the second embodiment, the color filters CF may overlap with each between adjacent pixel areas PA.

The first electrode EL1 is formed on the color filter CF while interposing the second insulating layer 113 therebetween.

The second electrode EL2 is formed on a fourth insulating layer 117. The first and second electrodes EL1 and EL2 generate an electric field between the first and second electrodes EL1 and EL2. A part of the second electrode EL2 is spaced apart from the third insulating layer 115, so that the TSC is defined between the third insulating layer 115 and the second electrode EL2.

The third insulating layer 115 is formed on the top surface of the first electrode EL1 to protect the first electrode EL1. In addition, the fourth insulating layer 117 is formed on the bottom surface of the second electrode EL2 to protect the second electrode EL2. The first electrode EL1 is insulated from the second electrode EL2 by the third and fourth insulating layers 115 and 117. Thus, actually, the TSC is provided between the third and fourth insulating layers 115 and 117.

The image display part DSP is provided in the hollow interior of the TSC between the first and second electrodes EL1 and EL2. As explained above, in one embodiment, the fluidic image display part DSP is retained within the hollow interior of the TSC by capillary forces or the like while the open tunnel ends of the TSC are closed off, for example by use of the protective layer PRT.

The protective layer PRT is formed on the second electrode EL2 while interposing the color filter CF and the fifth insulating layer 119 therebetween.

The black matrix BM is provided on the second electrode EL2. The black matrix BM is located at an edge of the pixel area PA. The black matrix BM extends in the first direction D1 while overlapping with the data line DL. When viewed from the top, the black matrix BM overlaps with both ends of the data line DL in the second direction D2.

Although the black matrix BM is formed on the second electrode EL2 in the second embodiment, the present teachings are not limited thereto. For instance, the black matrix BM can be formed between the substrate 110 and the color filter CF. In detail, the black matrix BM can be formed on the data line DL and the thin film transistor TFT and the color filter CF can be formed on the black matrix BM.

According to the second embodiment, the position and the shape of the color filter CF may be different from those of the color filter CF according to the first embodiment. Thus, the manufacturing conditions and the manufacturing sequence can also be variously changed.

Figure 12:
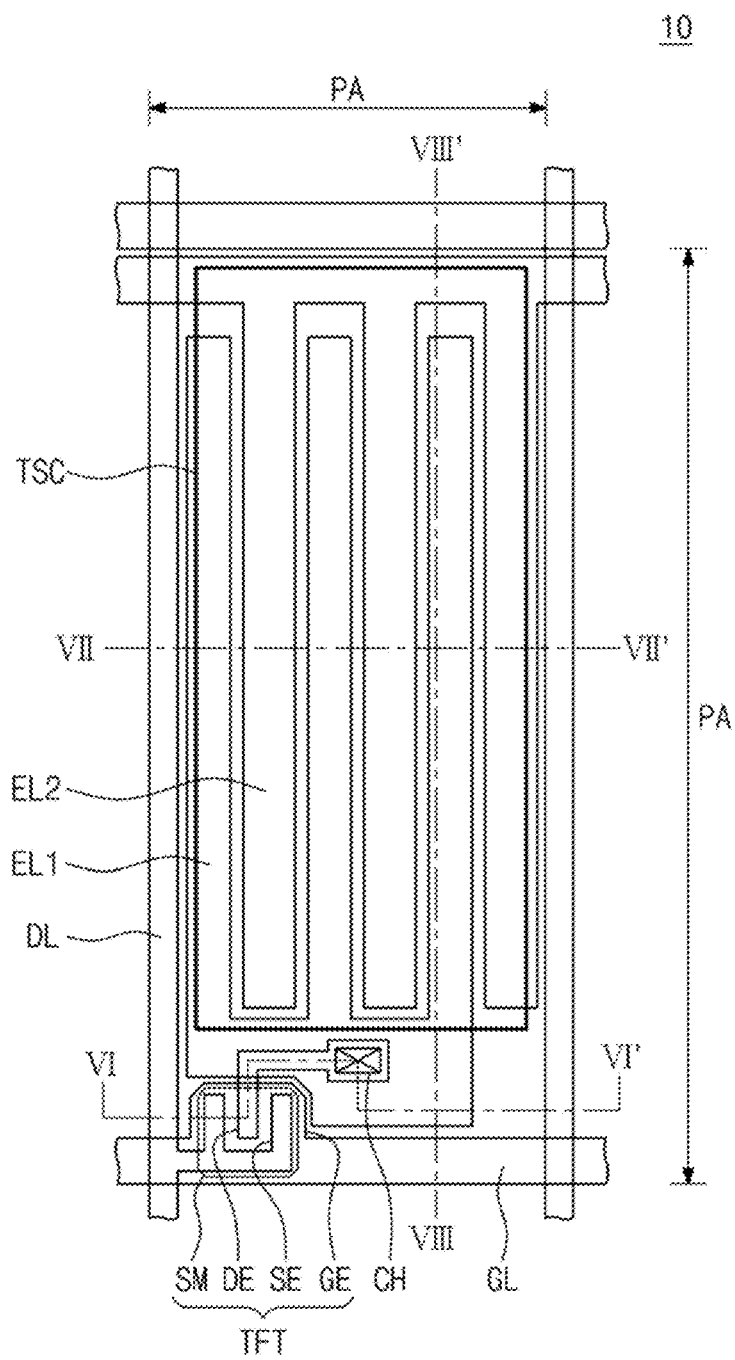
FIG. 12 is a plan view partially showing a display apparatus according to the third embodiment.
Figure 13:
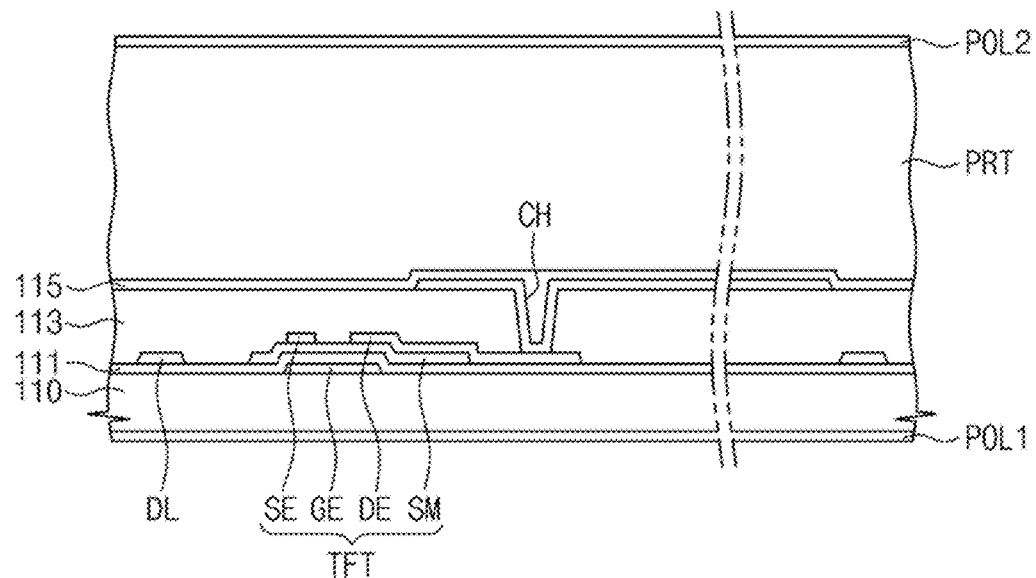
FIG. 13 is a sectional view taken along line VI-VI' of FIG. 12.
Figure 14:
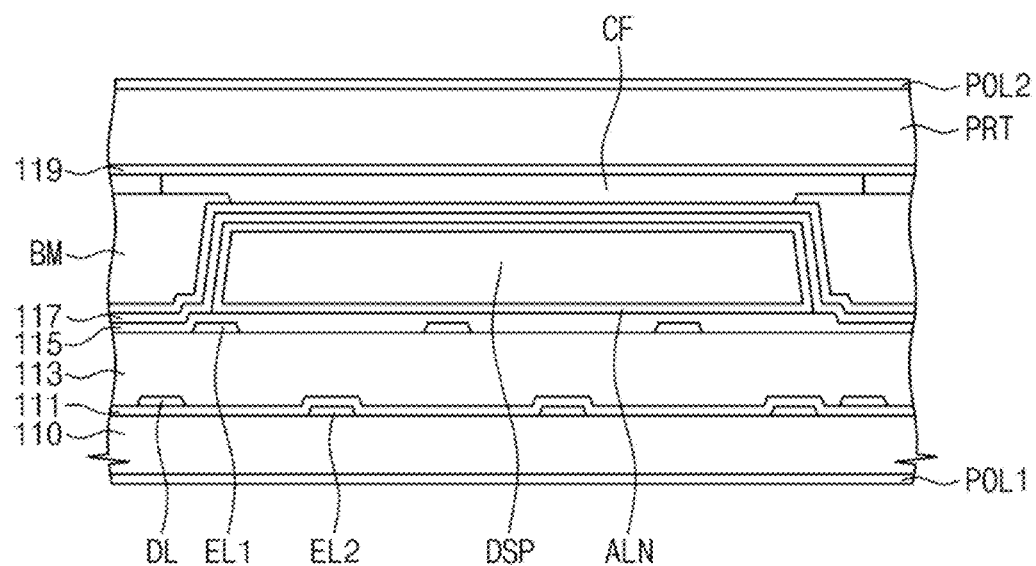
FIG. 14 is a sectional view taken along line VII-VII' of FIG. 12.
Figure 15:
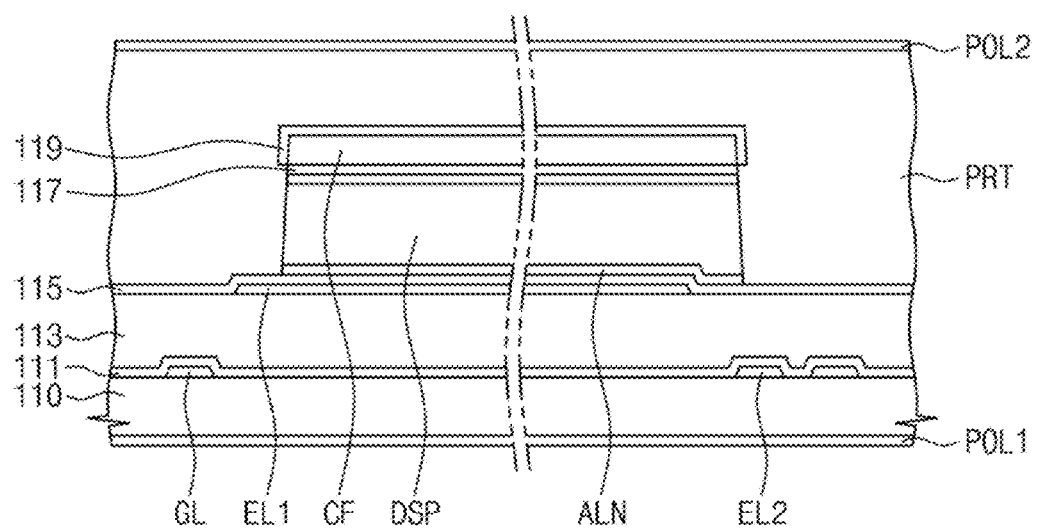
FIG. 15 is a sectional view taken along line VIII-VIII' of FIG. 12.

FIG. 12 is a plan view partially showing a display apparatus according to a third embodiment in accordance with the present disclosure of invention. FIG. 13 is a sectional view taken along line VI-VI' of FIG. 12, FIG. 14 is a sectional view taken along line VII-VII' of FIG. 12, and FIG. 15 is a sectional view taken along line VIII-VIII' of FIG. 12. The following description will be focused on the difference with respect to the first embodiment of the present disclosure in order to avoid redundancy. In addition, the same or similar reference numerals will be used to refer to the same or similar elements.

In the display apparatus according to the third embodiment, the image display part includes the liquid crystal layer and an electrode part including the first and second electrodes EL1 and EL2 is provided at a lower portion of the TSC. That is, the display apparatus according to the third embodiment corresponds to an IPS (in plane switching) type display apparatus or a PLS (plane to line switching) type display apparatus.

Referring to FIGS. 12 to 15, the display apparatus according to the third embodiment includes a substrate 110, a wiring, a thin film transistor TFT, a first electrode EL1, a second electrode EL2, an image display part DSP, and a protective layer PRT.

The gate line GL extends in one direction on the substrate 110.

The second electrode EL2 is formed on the substrate 110 while being spaced apart from the gate line GL. The second electrode EL2 includes a stem section substantially parallel to the gate line GL and a plurality of branches protruding the stem section. The second electrode EL2 and the gate line GL can be simultaneously formed in the same process step. In detail, the second electrode EL2 and the gate line GL may be simultaneously formed by forming a first conductive material on the substrate 110 and then patterning the first conductive material. Thus, the second electrode EL2 and the gate line GL may be formed by using the same material.

The data line DL is formed on the substrate 110 and the first insulating layer 111 is interposed between the data line DL and the substrate 110 in such a manner that the data line DL can be insulated from the gate line GL and the second electrode EL2. When viewed in a plan view, the data line DL substantially crosses the gate line GL and the stem section of the second electrode EL2.

The thin film transistor TFT is connected to the gate line GL and the data line DL and includes a gate electrode GE, a semiconductor layer SM, a source electrode SE and a drain electrode DE.

The gate electrode GE branches from the gate line GL. The semiconductor layer SM is formed on the gate line GL while interposing the first insulating layer 111 therebetween. The source electrode SE branches from the data line DL and partially overlaps with the semiconductor layer SM. The drain electrode DE is spaced apart from the source electrode SE while partially overlapping with the semiconductor layer SM. The semiconductor layer SM forms a conductive channel between the source electrode SE and the drain electrode DE.

The first electrode EL1 is connected to the drain electrode DE while interposing a second insulating layer 113 which covers the thin film transistor TFT is interposed between the first electrode EL1 and the drain electrode DE. The first electrode EL1 may include a stem section and a plurality of branches protruding from the stem section. Each branch of the first electrodes EL1 is interposed between adjacent branches of the second electrodes EL2. In detail, when viewed in a plan view, the branches of the first electrode EL1 are alternately arranged with the branches of the second electrode EL2.

The branches of the first and second electrodes EL1 and EL2 may generate the lateral electric field or the fringe electric field that extends through the fluidic material retained within the TSC.

The third insulating 115 is formed on the top surface of the first electrode EL1 to protect the first electrode EL1.

The fourth insulating layer 117 is formed on the third insulating layer 115. The TSC is defined by the third and fourth insulating layers 115 and 117. That is, a part of the fourth insulating layer 117 is spaced apart from the third insulating layer 115 so that the TSC is defined between the third and fourth insulating layers 115 and 117.

The image display part DSP is provided in the interior of the TSC between the third and fourth insulating layers 115 and 117.

The image display part DSP controls light passing through and/or reflected therefrom to thus display a desired image under the control of the electric field.

The protective layer PRT is formed on the second electrode EL2 while interposing the color filter CF, the black matrix BM and the fifth insulating layer 119 therebetween.

The color filter CF is formed on the fourth insulating layer 117 to cover the fourth insulating layer 117.

The color filter CF, the black matrix BM and the fifth insulating layer 119 are substantially identical to those of the first embodiment, so the detailed description thereof will be omitted.

According to the third embodiment, the first and second electrodes EL1 and EL2 may have various shapes and various positions. Thus, the display apparatus having various modes can be manufactured so that the operational conditions of the display apparatus, such as the viewing angle and the reaction speed, can be variously adjusted.

Although exemplary embodiments in accordance with the present disclosure of invention have been described, it is understood that the present teachings should not be limited to the specifics of these exemplary embodiments but various changes and modifications can be made in light of the foregoing by one of ordinary skilled in the art that fall within the spirit and scope of the present disclosure.

What is claimed is:

1. A display apparatus comprising:
   a base layer;
   an electrode part;
   a first insulating layer disposed on the base layer and including a contact portion contacted with the base layer and a cavity portion spaced apart from the base layer to provide a cavity extending in a first direction;
   an alignment layer contacted with a portion of the base layer corresponding to the cavity and an interior surface of the cavity portion, the alignment layer having an inseparable single body;
   an image display part provided in the cavity; and
   a protective layer configured to seal the cavity,
   wherein the cavity is defined between the cavity portion and the base layer in a normal direction of the base layer.

2. The display apparatus of claim 1, wherein the electrode part comprises first and second electrodes insulated from each other.

3. The display apparatus of claim 2, wherein the first and second electrodes are separated from each other with the image display part interposed between the first electrode and the second electrode.

4. The display apparatus of claim 3, wherein the second electrode is disposed on the first insulating layer.

5. The display apparatus of claim 3, wherein the base layer is disposed under the image display part to cover the first electrode.

6. The display apparatus of claim 2, wherein the first and second electrodes are provided under the image display part and separated from each other.

7. The display apparatus of claim 6, wherein the base layer is disposed under the image display part to overlap with the first and second electrodes.

8. The display apparatus of claim 1, further comprising a color filter disposed on the base layer.

9. The display apparatus of claim 8, wherein the color filter is disposed on the image display part.

10. The display apparatus of claim 8, wherein the color filter is disposed under the base layer.

11. The display apparatus of claim 1, wherein the contact portion and the cavity portion integrally is formed in an inseparable single body,
    the first insulating layer terminates at a first edge of the cavity portion and a second edge of the cavity portion facing each other in the first direction, and
    the first edge of the cavity portion and the second edge of the cavity portion is spaced apart from the base layer.

12. A display apparatus comprising:
    a base layer;
    an electrode part;
    a first insulating layer disposed on the base layer and including a contact portion contacted with the base layer and a cavity portion spaced apart from the base layer to provide a cavity extending in a first direction parallel to the base layer;
    an alignment layer contacted with a portion of the base layer corresponding to the cavity and an interior surface of the cavity portion, the alignment layer having an inseparable single body and extending in the first direction;
    an image display part provided in the cavity; and
    a protective layer configured to seal the cavity,
    wherein a first opening is defined in the alignment layer, a second opening is defined in the alignment layer, and the first opening is opposite to the second opening in the first direction.

* * * * *